G. H. RABENALT.
PROCESS OF TREATING BATTERY PLATES.
APPLICATION FILED FEB. 6, 1913.
1,104,273.
Patented July 21, 1914.
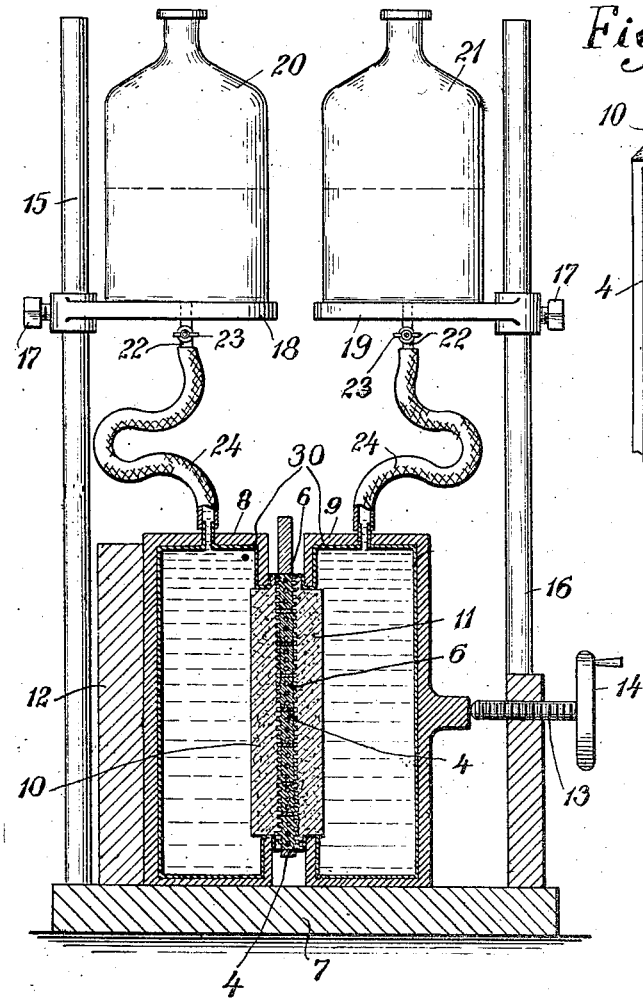
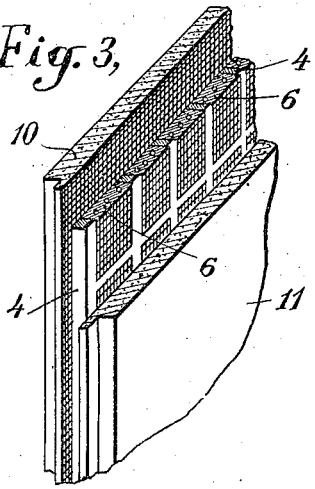
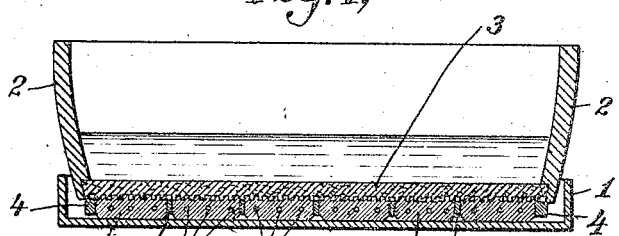
WITNESSES
George Schlatt.
John O. Gempler
INVENTOR
Gustav H. Rabenalt
BY
Kenyon & Kenyon
ATTORNEYS

UNITED STATES PATENT OFFICE.

GUSTAV H. RABENALT, OF BUFFALO, NEW YORK, ASSIGNOR TO GOULD STORAGE BATTERY COMPANY, A CORPORATION OF NEW YORK.

PROCESS OF TREATING BATTERY-PLATES.

1,104,273.  Specification of Letters Patent.  Patented July 21, 1914.

Application filed February 6, 1913. Serial No. 746,484.

*To all whom it may concern:*

Be it known that I, GUSTAV H. RABENALT, a citizen of the United States, and a resident of Buffalo, county of Erie, and State of New York, have invented certain new and useful Improvements in Processes of Treating Battery-Plates, of which the following is a specification.

My invention relates to processes of treating battery plates and more especially processes of increasing the active surface of pasted storage battery plates.

One object of my invention is to provide a process by which a die may be caused to increase the surface area of the active material and the die withdrawn without the paste sticking thereto or the die pulling or breaking away the paste to any material extent.

Further objects, features and advantages will more clearly appear from the detailed description given below.

In carrying out my process in one form, I apply a die with a rough face to the surface of the paste of the plate to increase the active surface thereof, and while the die is still engaged with the paste and before it is removed therefrom, I cause a reagent or other means to act upon the surface of the paste to set or harden the same so that when the die is removed the paste will not stick to the die. Preferably the die is made porous and sulfuric acid is passed through the pores of the die before the die is removed from the plate, the sulfuric acid acting chemically upon the lead oxid of the paste at the surface to set or harden the same.

The detailed operation of the process in its preferred form will more clearly appear from the accompanying drawings and the following description of an apparatus and its operation designed to carry out the process.

In the drawings, Figure 1 is a section through an apparatus illustrating my invention in its broader aspects. Fig. 2 is a section through an apparatus illustrating my invention in a more improved form, and Fig. 3 shows in perspective a portion of the two dies with the intermediate plate of Fig. 2, the dies and plate being broken away at different heights.

Referring to Fig. 1, 1 represents a shallow dish made of any suitable material for holding sulfuric acid. 2 represents a second dish also designed to hold sulfuric acid so that its side walls are made of acid-resisting material. Set in the bottom of the dish 2 is a die 3 constructed of porous material capable of substantially resisting attack by sulfuric acid. I find that a material known as alundum is suitable for this purpose, and although I have used wood, any other porous material which is not too readily attacked by the reagent used in the dish 2 may be used. The lower face of the die 3 is roughened as by having a series of small grooves extending thereover.

In operation a battery plate (for instance, one composed of a grid having strengthening ribs 4 and intermediate conductors 5 of inactive material which carry and support the lead oxid paste 6) is laid on the bottom of the dish 1. Thereupon the dish 2 containing sulfuric acid is placed upon the battery plate and the die 3 forced into the top face of the paste of the plate so as to increase the surface of the paste to increase the active area thereof. While the die remains thus pressed into the paste and even as it is being pressed into the paste the sulfuric acid permeates through the pores of the die and attacks the paste, forming sulfate which causes the surface of the paste to harden or set so that after about a minute the dish 2 with its die 3 may be removed without any danger of it pulling any of the paste with it. The other side of the battery plate may then be treated in the same manner.

Referring to Figs. 2 and 3, I there illustrate an improved arrangement. The base 7 is adapted to support two containers 8 and 9, each being lead lined as at 30 so as to be resistant to sulfuric acid. Each of the containers is open on one side and these open portions are closed by dies 10 and 11 respectively. Each of the dies 10 and 11 is made of porous material adapted to resist chemical attack by the contents of the containers, as already described in connection with the die 3. Each die 10 and 11 is also roughened on its outer face, as by being grooved or provided with irregular projections and indentations. The container 8 abuts against a fixed standard while the container 9 is adapted to be moved toward the container 8 by means of a screw 13, and hand wheel 14.

Adjustably carried upon two upright standards 15 and 16, as by set screws 17, are two platforms 18 and 19. These platforms are adapted to carry large glass reservoirs 20 and 21 respectively. Each reservoir is provided with an outlet 22 in its bottom, each having a stop cock 23. Each outlet 22 is connected to one of the containers by a flexible rubber conduit 24, so that the reservoir 20 acts as means for supplying the paste-setting reagent to the container 8 and the reservoir 21 supplies it to the container 9.

In operation a pasted battery plate (for instance, one composed of a grid having strengthening ribs 4 and paste 6) is placed flat against the die 10. The container 9 with its die 11 is then moved toward the opposite side of the battery plate by means of the screw 13, so that both dies 10 and 11 are simultaneously forced into the opposite faces of the pasted plate to increase the area of the active surface thereof. Simultaneously with this, or before the dies have been removed from engagement with the paste the cocks 23 are opened, permitting the sulfuric acid in the containers 8 and 9 to pass through the pores of the dies under the head of pressure of the sulfuric acid in the reservoirs 20 and 21, so that the acid acts on the paste to set or harden both sides thereof at the same time by the formation of sulfate, whereby the dies may be removed in about a minute without danger of pulling the paste away with them. The cocks 23 being again closed little or no further acid will pass through the dies due to atmospheric back pressure. This sulfating action is preferably only allowed to act on the paste for a slight depth, it being found that after one or two minutes the setting has become sufficiently deep so that the dies may be removed. In this state the surface of the paste is firm or hard, with respect to the paste farther away from the surface. The amount of or rate of acid flowing through the dies may be regulated by changing the pressure head by adjusting the height of one or both of the reservoirs 20 and 21, each being adjusted to operate under a different pressure if desired, to compensate for differences in permeability of the porous dies. After this surface treatment by sulfating and increasing the effective area of the plate which takes place before electrolysis of the plate in the cell, the paste may be subjected to any further treatment the particular paste composition may require. Any other suitable reagent or means may be used for setting the surface of the paste so that the paste will not stick to the dies when they are removed, but it is important to my invention in its best form that the setting action occur while the die is still engaged with the paste. The containers 20 and 21, or dish 2, act as efficient and simple means for supplying the setting reagent to the dies, and cause it to pass through the pores thereof, and the dies being porous they form a simple and efficient means for conveying the reagent to the paste before the dies are removed, although other means may be used for this purpose if the setting action occurs while the dies are still engaged with the paste.

While I have described my improvements in great detail and with respect to certain particular embodiments thereof, I do not desire to be limited to such details except as clearly specified in the appended claims, since radical changes and modifications may well be made without departing from the spirit and scope of my invention in its broader aspects.

Having fully and clearly described my improvements, what I claim as new and desire to secure by Letters Patent, is:

1. The improved process of increasing the active surface of pasted storage battery plates which consists in applying a die to the surface of the paste to increase the active area thereof and treating the surface with a reagent to set said surface before the plate is subjected to electrolysis.

2. The improved process of increasing the active surface of pasted battery plates which consists in applying an irregular faced die to the surface of the paste and treating the said surface with a reagent to set said surface while the die is applied thereto and before the die is removed.

3. The improved process of increasing the active surface of pasted battery plates which consists in applying an irregular faced die to the surface of the paste and treating the said surface with sulfuric acid to set said surface before the die is removed.

4. The improved process of increasing the active area of pasted battery plates which consists in applying a die to the surface of the paste to increase the active area thereof and treating the surface with a reagent to form a sulfate at said surface to cause said surface to set while the die is applied thereto and before the die is removed.

5. The improved process of increasing the active area of pasted battery plates which consists in applying a die to the surface of the paste while soft and simultaneously treating the surface with a reagent to set the paste to make it firm.

6. The improved process of increasing the active surface of pasted battery plates, which consists in applying an irregular faced die to the surface of the paste and treating the surface with sulfuric acid to set the surface to make it firm before the plate is subjected to electrolysis.

7. The improved process of increasing the active area of the surface of storage battery plates, which consists in simultaneously applying irregular faced dies to the pasted surfaces on opposite sides of the plate to increase the active area thereof and treating the said surfaces with a reagent to set said surfaces before the dies are removed.

8. The improved process of increasing the active area of pasted battery plates, which consists in simultaneously applying a die to the surface and treating the surface with a sulfating reagent to set the surface.

In testimony whereof, I have signed my name to this specification, in the presence of two subscribing witnesses.

GUSTAV H. RABENALT.

Witnesses:
   D. W. NOBLE,
   FRED. C. GEYER.